United States Patent
Styles et al.

(10) Patent No.: US 8,352,659 B1
(45) Date of Patent: Jan. 8, 2013

(54) SEGMENTATION AND REASSEMBLY OF A DATA VALUE COMMUNICATED VIA INTERRUPT TRANSACTIONS

(75) Inventors: Henry E. Styles, Menlo Park, CA (US); Richard S. Ballantyne, Stittsville, CA (US); Mark Paluszkiewicz, Schaumburg, IL (US); Ralph D. Wittig, Menlo Park, CA (US)

(73) Assignee: Xilinx, Inc., San Jose, CA (US)

( * ) Notice: Subject to any disclaimer, the term of this patent is extended or adjusted under 35 U.S.C. 154(b) by 697 days.

(21) Appl. No.: 12/609,338

(22) Filed: Oct. 30, 2009

(51) Int. Cl.
 *G06F 13/24* (2006.01)
 *G06F 13/14* (2006.01)
(52) U.S. Cl. ........................ 710/263; 710/269
(58) Field of Classification Search .................. 710/260, 710/261, 263, 266, 268–269
 See application file for complete search history.

(56) References Cited

U.S. PATENT DOCUMENTS

| | | | | |
|---|---|---|---|---|
| 5,319,753 | A * | 6/1994 | MacKenna et al. | 710/48 |
| 5,666,551 | A * | 9/1997 | Fenwick et al. | 709/207 |
| 6,321,285 | B1 * | 11/2001 | Sheafor et al. | 710/306 |
| 6,813,700 | B2 * | 11/2004 | Fallah et al. | 711/220 |
| 7,099,336 | B2 * | 8/2006 | Kalkunte et al. | 370/398 |
| 7,398,341 | B1 * | 7/2008 | Gaither | 710/69 |
| 7,805,562 | B2 * | 9/2010 | Yada et al. | 711/103 |
| 2003/0084388 | A1 * | 5/2003 | Williamson et al. | 714/725 |

OTHER PUBLICATIONS

Intel Corp., *Intel 82093AA I/O Advanced Programmable Interrupt Controller (I/O APIC)* Doc. No. 290710-001, Jan. 2001, pp. 1-15, Intel Corp., Santa Clara, California, USA.

Intel Corp., *Intel 64 and IA-32 Architectures Software Developer's Manual*, vol. 3A: System Programming Guide, Part 1, Doc. No. 253668, Sep. 2008, p. 7-45, Intel Corp., Santa Clara, California, USA.

* cited by examiner

*Primary Examiner* — Paul R Myers
*Assistant Examiner* — Trisha Vu
(74) *Attorney, Agent, or Firm* — LeRoy D. Maunu; Lois D. Cartier

(57) ABSTRACT

Approaches for communicating data from a source device to a target device. In one approach, a communicated data value is segmented into a plurality of data chunks at the source device. A sequence of interrupt transactions is transmitted from the source device to a system bus. The transmitting of each interrupt transaction in the sequence includes transmitting a target identifier on an address bus of the system bus, and the target identifier of each interrupt transaction in the sequence includes a respective one of the data chunks. The sequence of interrupt transactions from the system bus is received at the target device. The communicated data value is reassembled at the target device from the data chunks in the target identifier of the interrupt transactions in the sequence.

19 Claims, 4 Drawing Sheets

SEGMENTATION AND REASSEMBLY OF A DATA VALUE COMMUNICATED VIA INTERRUPT TRANSACTIONS

FIELD OF THE INVENTION

The present invention generally relates to data processing, and more particularly to communications of data values over a data bus.

BACKGROUND

High-speed data busses frequently have significant error rates. Error correcting codes permit successful data communicate over a high-speed data bus with a significant error rate. For example, low-density parity-check codes correct high error rates for statistically distributed errors. However, error correcting codes are generally useless for high error rates that are not statistically distributed or for complete data corruption.

There is a general need for reliable communication when the normal data communication channels approach complete data corruption. Communication at reduced bandwidth is acceptable to localize the source of the corruption for error logging, and potentially to remove the source of the corruption.

The present invention may address one or more of the above issues.

SUMMARY

The various embodiments of the invention provide for communicating data from a source device to a target device. In one embodiment, a method includes segmenting a communicated data value into a plurality of data chunks at the source device. A sequence of interrupt transactions is transmitted from the source device to a system bus. The transmitting of each interrupt transaction in the sequence includes transmitting a target identifier on an address bus of the system bus, and the target identifier of each interrupt transaction in the sequence includes a respective one of the data chunks. The sequence of interrupt transactions from the system bus is received at the target device. The communicated data value is reassembled at the target device from the data chunks in the target identifier of the interrupt transactions in the sequence.

In another embodiment, a computing system is provided for communicating data. The computing system includes a system bus and a first processor coupled to the system bus. The system bus includes an address bus and a data bus, with the data bus operating at a higher switching rate than the address bus. The system bus also has a first and second socket and assigns respective package identifiers to the sockets. The first processor is coupled to the address and data busses in the first socket of the system bus.

The first processor segments a communicated data value into a plurality of data chunks and transmits a sequence of interrupt transaction on the system bus. The first processor includes a respective one of the data chunks in each interrupt transaction in the sequence, where each interrupt transaction in the sequence including an interrupt vector and a first and second identifier. The first processor transmits the interrupt vector on the data bus and transmits the first and second identifiers on the address bus. The first processor sets the first identifier of each interrupt transaction in the sequence to the respective package identifier of the second socket and also sets the second identifier of the interrupt transaction to the respective data chunk for the interrupt transaction.

A second processor is coupled to the address and data busses in the second socket of the system bus. The second processor successfully receives the address bus and unreliably receives the data bus at the higher switching rate prior to a training. The second processor receives and accepts each interrupt transaction in the sequence in response to the first identifier of the interrupt transaction including the respective package identifier of the second socket. The second processor reassembles the communicated data value from the data chunks in the second identifier of the interrupt transactions in the sequence. The second processor then successfully receives the data bus after the training. After the training the second processor receives a plurality of predetermined data values on the data bus in response to the communicated data value reassembled from the sequence of interrupt transactions.

A method of communicating data from a first processor to a second processor is provided in another embodiment. The method includes assigning respective package identifiers to a first and second socket of a system bus. The system bus includes an address bus and a data bus, with the data bus operating at a higher switching rate than the address bus. A communicated data value is segmented into a plurality of data chunks at the first processor in the first socket. A sequence of interrupt transactions is transmitted to the system bus from the first processor. Each interrupt transaction in the sequence includes an interrupt vector and a first and second identifier.

The transmitting of each interrupt transaction in the sequence includes transmitting the interrupt vector on the data bus and transmitting the first and second identifiers on the address bus. The transmitting of the interrupt vector on the data bus is at the higher switching rate than the transmitting of the first and second identifier on the address bus. The first identifier of each interrupt transaction in the sequence is set to the respective package identifier of the second socket, and the second identifier of each interrupt transaction in the sequence is set to a respective one of the data chunks. Each interrupt transaction in the sequence is received from the system bus at the second processor in the second socket. The receiving includes successfully receiving the address bus and unreliably receiving the data bus prior to training in during which a plurality of predetermined data values are received on the data bus, and successfully receiving the data bus after the training.

The method further includes accepting, at the second processor prior to the training, each interrupt transaction in the sequence in response to the first identifier of the interrupt transaction including the respective package identifier of the second socket. The communicated data value is reassembled at the second processor from the data chunks in the second identifier of the interrupt transactions in the sequence.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which.

DETAILED DESCRIPTION

Figure 1:
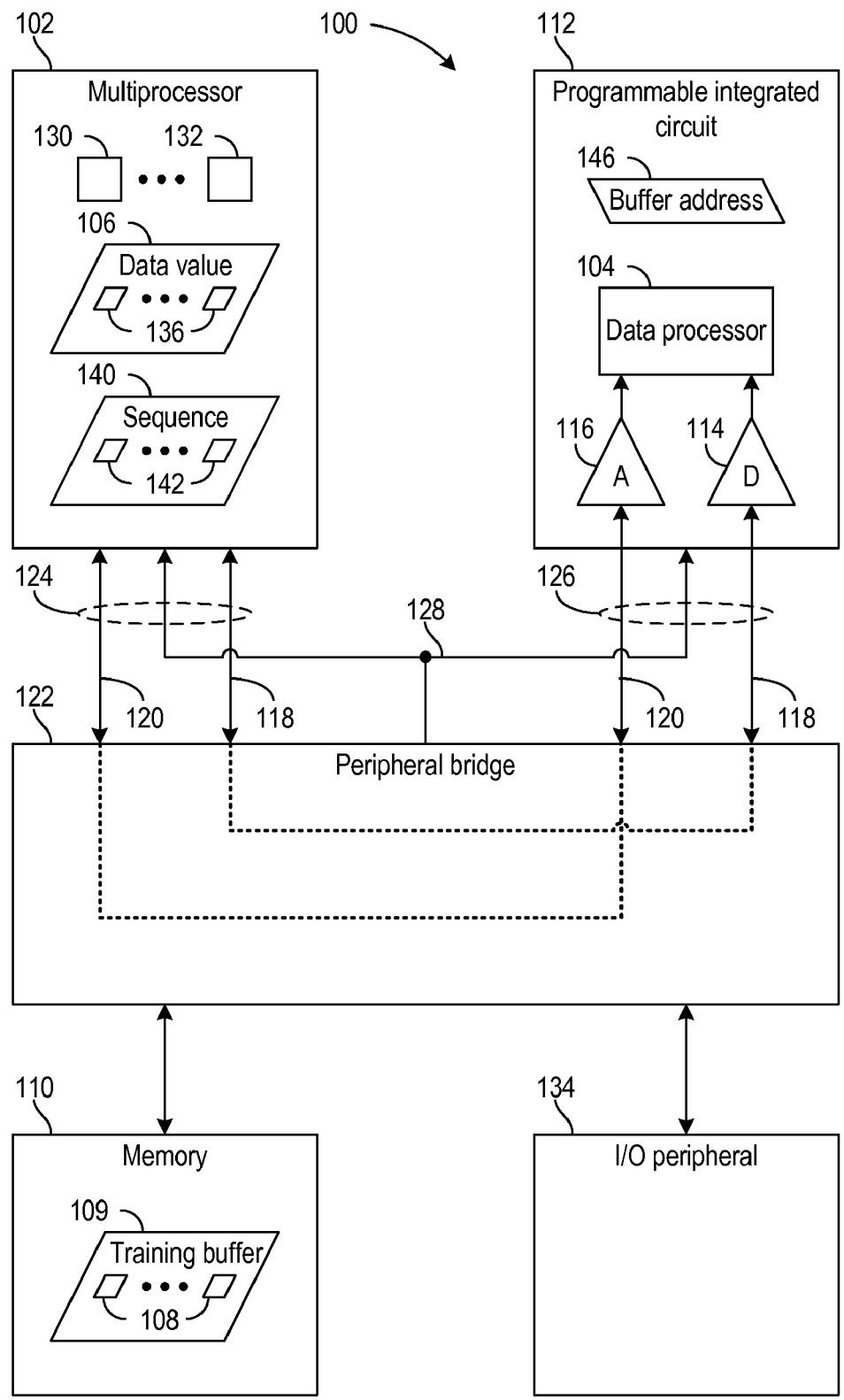
FIG. 1 is a block diagram of a system for communicating data in accordance with various embodiments of the invention.

FIG. 1 is a block diagram of a system 100 for communicating data in accordance with various embodiments of the invention. Multiprocessor 102 and data processor 104 initially communicate data value 106 from multiprocessor 102 to data processor 104. Subsequently, processors 102 and 104 communicate the training data 108 in the training buffer 109 from multiprocessor 102 to data processor 104 via memory 110. Finally, processors 102 and 104 exchange arbitrary data via memory 110.

In one embodiment, the data processor 104 is implemented in a programmable integrated circuit 112 that includes a plurality of programmable receivers 114 and 116. Programmable receivers 114 and 116 are configurable to implement a wide variety of communication protocols. In one example, a system bus includes an address bus 120 and a data bus 118 that has a switching rate of twice the switching rate of the address bus 120, and programmable receivers 114 and 116 are configurable to operate properly at either switching rate. Thus, the configuration of each of the programmable receivers 114 and 116 depends upon which bus 118 or 120 is connected to the programmable receiver.

In addition to the configurations of programmable receivers 114 and 116 depending upon the connected bus 118 or 120, the process of configuring the programmable receivers 114 and 116 can depend upon the connected bus 118 or 120. In one example, a predetermined configuration permits programmable receivers 116 to successfully receive data from address bus 120, but after an initial configuration of programmable receivers 114, programmable receivers 114 must be trained to reliably receive data from data bus 118. Before training, programmable receivers 114 might receive data from data bus 118 that is completely corrupt due to the higher switching rate of data bus 118. Thus, error correcting codes cannot compensate for any data corruption occurring prior to the training of programmable receivers 114. During training, the programmable receivers 114 receive known training data 108 and the configuration of programmable receivers 114 is adjusted until the known training data 108 is properly received. Thereafter, the programmable receivers 114 successfully receive arbitrary data from data bus 118.

In one embodiment, multiprocessor 102 executes an operating system and application programs, while the data processor 104 implements an application component, such as a database query engine, in hardware. The hardware implementation of a critical application component in data processor 104 provides higher performance than implementing the critical application component in software executing on multiprocessor 102. However, the flexibility of a general-purpose computing system is not lost because the operating system and the non-critical application programs continue to execute on multiprocessor 102.

To train the programmable receivers 114, known training data 108 is created in buffer 109 in memory 110. Because the operating system manages the allocation data buffers in memory 110, multiprocessor 102 allocates the buffer 109 in memory 110 for the training data 108. Multiprocessor 102 also initializes the buffer 109 with the predetermined training data 108 in one embodiment. To train the programmable receivers 114, data processor 104 reads the training data 108 from memory 110. For data processor 104 to read the training data 108 from memory 110, data processor 104 must get the address of the location of the buffer 109 in memory 110. Because multiprocessor 102 allocates the buffer 109 in memory 110 for training data 108, multiprocessor 102 transfers the address of the buffer 109 to data processor 104. However, multiprocessor 102 cannot transfer the address to data processor 104 because data bus 118 cannot successfully transfer data until training is complete. Thus, before training can begin data processor 104 must get the address of the buffer 109 in memory 110 from multiprocessor 102, but data processor 104 cannot get this address from multiprocessor 102 unless training is already complete.

In certain embodiments of the invention, the address of the buffer 109 for training data 108 in memory 110 is the data value 106 communicated from multiprocessor 102 to data processor 104 without using unreliable data bus 118. After transferring the data value 106 to data processor 104, data processor 104 can train programmable receivers 114 by reading the training data 108 from the addressed location in memory 110. After training is complete, multiprocessor 102 and data processor 104 can exchange arbitrary data.

In various embodiments, a peripheral bridge 122 provides sockets 124 and 126 for processor 102 and programmable integrated circuit 112. During reset of the system 100, peripheral bridge 122 asserts a reset signal on line 128 and outputs respective package identifiers to the sockets 124 and 126 on address bus 120. Multiprocessor 102 and data processor 104 capture their respective package identifiers during the reset. Multiprocessor 102 includes multiple processors 130 through 132, and peripheral bridge 122 accommodates multiple processors 130 through 132 in multiprocessor 102 by assigning multiple subpackage identifiers to socket 124. Peripheral bridge 122 similarly assigns multiple subpackage identifiers to socket 126.

When bridge 122 receives an interrupt transaction, such as an input/output service request from peripheral 134, bridge 122 routes the interrupt transaction to the appropriate socket 124 or 126 based on the package identifier included in the interrupt transaction. If the interrupt transaction is routed to multiprocessor 102, multiprocessor 102 accepts the interrupt transaction because the package identifier matches the package identifier multiprocessor 102 received during reset, and multiprocessor 102 routes the interrupt transaction to the appropriate processor 130 through 132 based on the subpackage identifier included in the interrupt transaction. Thus, the interrupt transaction includes package and subpackage identifiers that specify the ultimate destination for the interrupt transaction.

If multiprocessor 102 issues an interrupt transaction, bridge 122 routes the interrupt transaction to the appropriate socket 124 or 126 based on the package identifier included in the interrupt transaction. Thus, when processors 130 through 132 in multiprocessor 102 issue an interrupt transaction including the package identifier of socket 126, bridge 122 routes the interrupt transaction to programmable integrated circuit 112. Because the interrupt transaction includes information transferred via both the address bus on line 120 and the data bus on line 118, the information transferred on the address bus on line 120 is always successfully received by programmable receivers 116 even though prior to training the information transferred on the data bus on line 118 is unreliably received by programmable receivers 114.

In one or more embodiments, an interrupt transaction includes an interrupt vector transferred on the data bus on line 118 and a target identifier transferred on the address bus on line 120. Software executing on a processor 130 or 132 of multiprocessor 102 controls the value of the interrupt vector and the target identifier included in an interrupt transaction. In another embodiment, the interrupt vector is arbitrary and not controllable by processors 130 and 132. Software executing on a processor 130 or 132 generates an interrupt transaction routed to data processor 104 by setting the package identifier of the target identifier in the interrupt transaction to the package identifier assigned to socket 126. Because the programmable integrated circuit 112 does not implement more than one data processor 104, the subpackage identifier of the target identifier in the interrupt transaction can be set to arbitrary data.

In various embodiments, the subpackage identifier of the target identifier in the interrupt transaction is not set to arbitrary data, but instead conveys information from multiprocessor 102 to data processor 104 before the training of the programmable data receivers 114. Because a multiprocessor 102 often includes two or four processors 130 through 132, the subpackage identifier of the target identifier in the interrupt transaction is often a field including one or two bits. Thus, multiprocessor 102 cannot transfer a data value 106 with more than two bits to data processor 104 in a single interrupt transaction. Instead, the data value 106 is broken in to data chunks 136, each having the number of bits of the subpackage identifier of the target identifier in an interrupt transaction. Multiprocessor 102 generates a sequence 140 of interrupt transactions 142, and each of the interrupt transactions 142 includes one of the data chunks 136 in the subpackage identifier of the target identifier in the interrupt transaction.

In certain embodiments, multiprocessor 102 sets the data value 106 to the address of the location of the buffer 109 for the training data 108 in memory 110, and multiprocessor 102 issues the sequence 140 of interrupt transactions 142 having the target package identifier set to the package identifier of socket 126 and having the target subpackage identifier set to respective data chunks 136. Because the interrupt transactions 142 in the sequence 140 have a target subpackage identifier matching socket 126, bridge 122 routes the interrupt transactions to programmable integrated circuit 112. Before the programmable data receivers 114 are trained, the programmable data receivers 116 successfully receive the target identifier of the interrupt transactions from address bus 120. From the sequence 140 of interrupt transactions 142, data processor 104 reassembles the buffer address 146 of the location of the training buffer 109 in memory 110. Data processor 104 then trains programmable data receivers 114 by reading the training data 108 from the addressed location in memory 110 and adjusting the configuration of programmable data receivers 114 until the training data 108 is successfully received. Thereafter, the programmable receivers 114 successfully receive arbitrary data from data bus 118.

Figure 2:
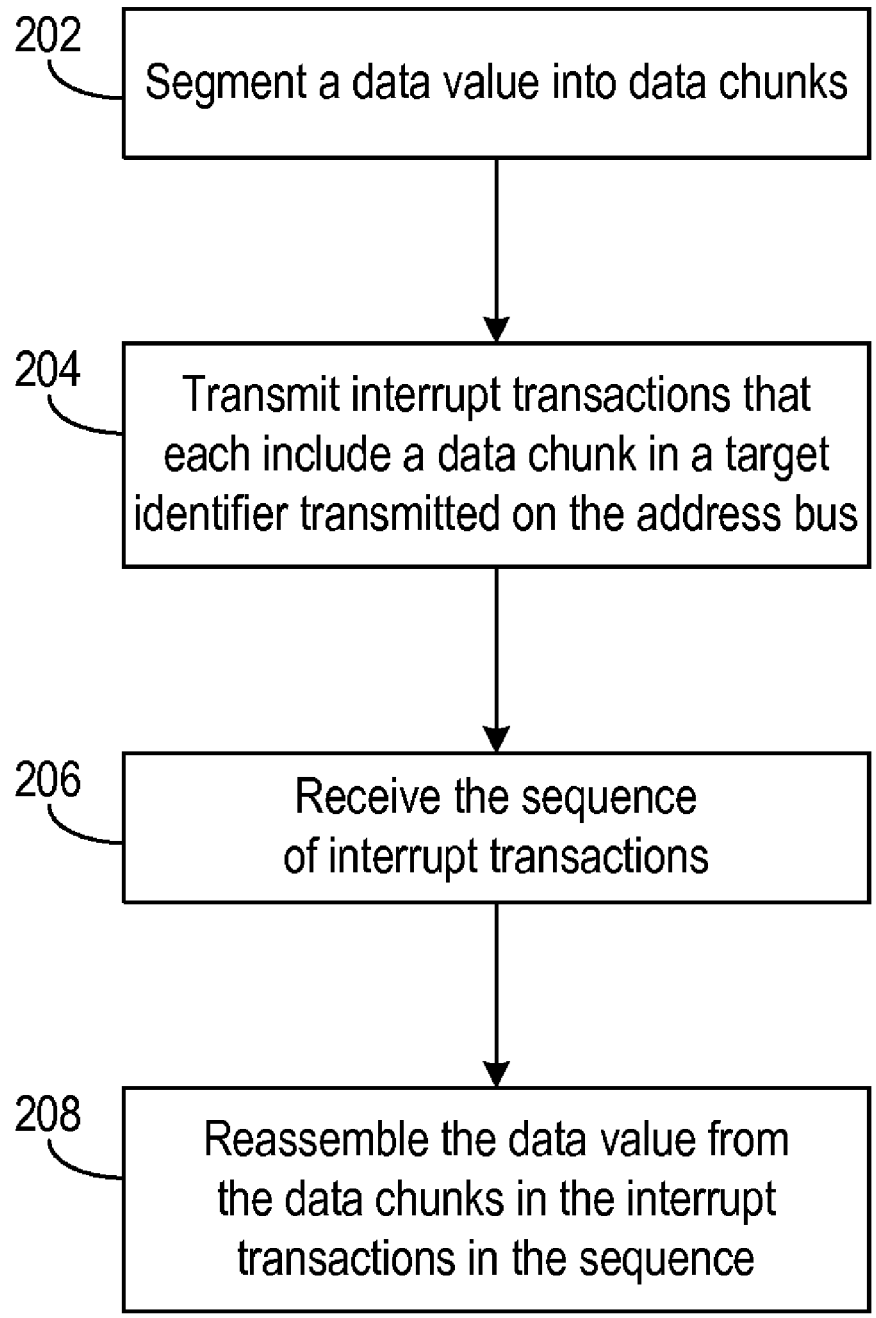
FIG. 2 is a flow diagram of a process for communicating data in accordance with various embodiments of the invention.

FIG. 2 is a flow diagram of a process for communicating data in accordance with various embodiments of the invention. In one embodiment, the normal data communication path is initially unreliable and an alternative communication path uses interrupt transactions to communicate a data value, and this communicated data value helps establish reliable communication over the normal data communication path.

At step 202, a source device segments the data value into a plurality of data chunks that each fit within a target identifier included in interrupt transactions. At step 204, the source device transmits a sequence of interrupt transactions on a system bus, with each interrupt transaction in the sequence carrying one of the data chunks in the target identifier transmitted on the address bus of the system bus.

At step 206, a target device receives the sequence of interrupt transactions. At step 208, the target device reassembles the data value from the data chunks in the target identifier of the interrupt transactions in the sequence. Thus, source device communicates the data value to the target device in the sequence of interrupt transactions without using information transmitted on the data bus by the interrupt transactions.

Figure 3:
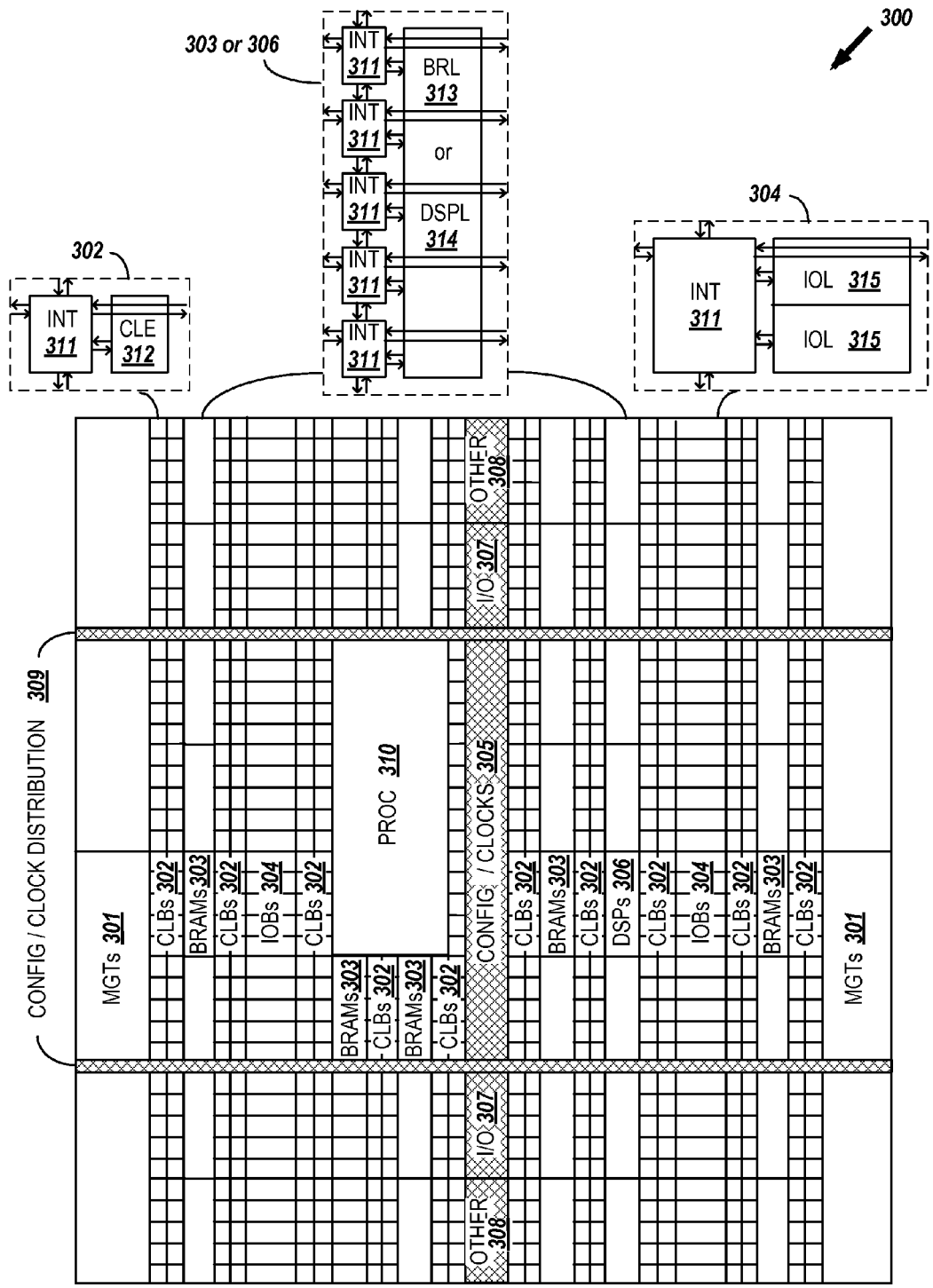
FIG. 3 is a block diagram of a programmable integrated circuit using data communicated in accordance with various embodiments of the invention.

FIG. 3 is a block diagram of a programmable integrated circuit using data communicated in accordance with various embodiments of the invention. In one embodiment, the programmable integrated circuit implements a data processor that receives the data from a sequence of interrupt transactions using information transmitted on the address bus by the interrupt transactions.

Programmable integrated circuits, such as advanced FPGAs, can include several different types of programmable logic blocks in the array. For example, FIG. 3 illustrates an FPGA architecture 300 that includes a large number of different programmable tiles including multi-gigabit transceivers (MGTs 301), configurable logic blocks (CLBs 302), random access memory blocks (BRAMs 303), input/output blocks (IOBs 304), configuration and clocking logic (CONFIG/CLOCKS 305), digital signal processing blocks (DSPs 306), specialized input/output blocks (I/O 307) (e.g., configuration ports and clock ports), and other programmable logic 308 such as digital clock managers, analog-to-digital converters, system monitoring logic, and so forth. Some FPGAs also include dedicated processor blocks (PROC 310). MGTs 301 include the programmable receivers 114 and 116 of FIG. 1 in one embodiment of the invention.

In some FPGAs, each programmable tile includes a programmable interconnect element (INT 311) having standardized connections to and from a corresponding interconnect element in each adjacent tile. Therefore, the programmable interconnect elements taken together implement the programmable interconnect structure for the illustrated FPGA. The programmable interconnect element (INT 311) also includes the connections to and from the programmable logic element within the same tile, as shown by the examples included at the top of FIG. 3.

For example, a CLB 302 can include a configurable logic element (CLE 312) that can be programmed to implement user logic plus a single programmable interconnect element (INT 311). A BRAM 303 can include a BRAM logic element (BRL 313) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 306 can include a DSP logic element (DSPL 314) in addition to an appropriate number of programmable interconnect elements. An 10B 304 can include, for example, two instances of an input/output logic element (IOL 315) in addition to one instance of the programmable interconnect element (INT 311). As will be clear to those of skill in the art, the actual I/O pads connected, for example, to the I/O logic element 315 are manufactured using metal layered above the various illustrated logic blocks, and typically are not confined to the area of the input/output logic element 315.

In the pictured embodiment, a columnar area near the center of the die (shown shaded in FIG. 3) is used for configuration, clock, and other control logic. Horizontal areas 309 extending from this column are used to distribute the clocks and configuration signals across the breadth of the FPGA.

Some FPGAs utilizing the architecture illustrated in FIG. 3 include additional logic blocks that disrupt the regular columnar structure making up a large part of the FPGA. The additional logic blocks can be programmable blocks and/or dedicated logic. For example, the processor block PROC 310 shown in FIG. 3 spans several columns of CLBs and BRAMs.

Note that FIG. 3 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 3 are purely exemplary. For example, in an actual FPGA more than one adjacent column of CLBs is typically included wherever the CLBs appear, to facilitate the efficient implementation of user logic.

Figure 4:
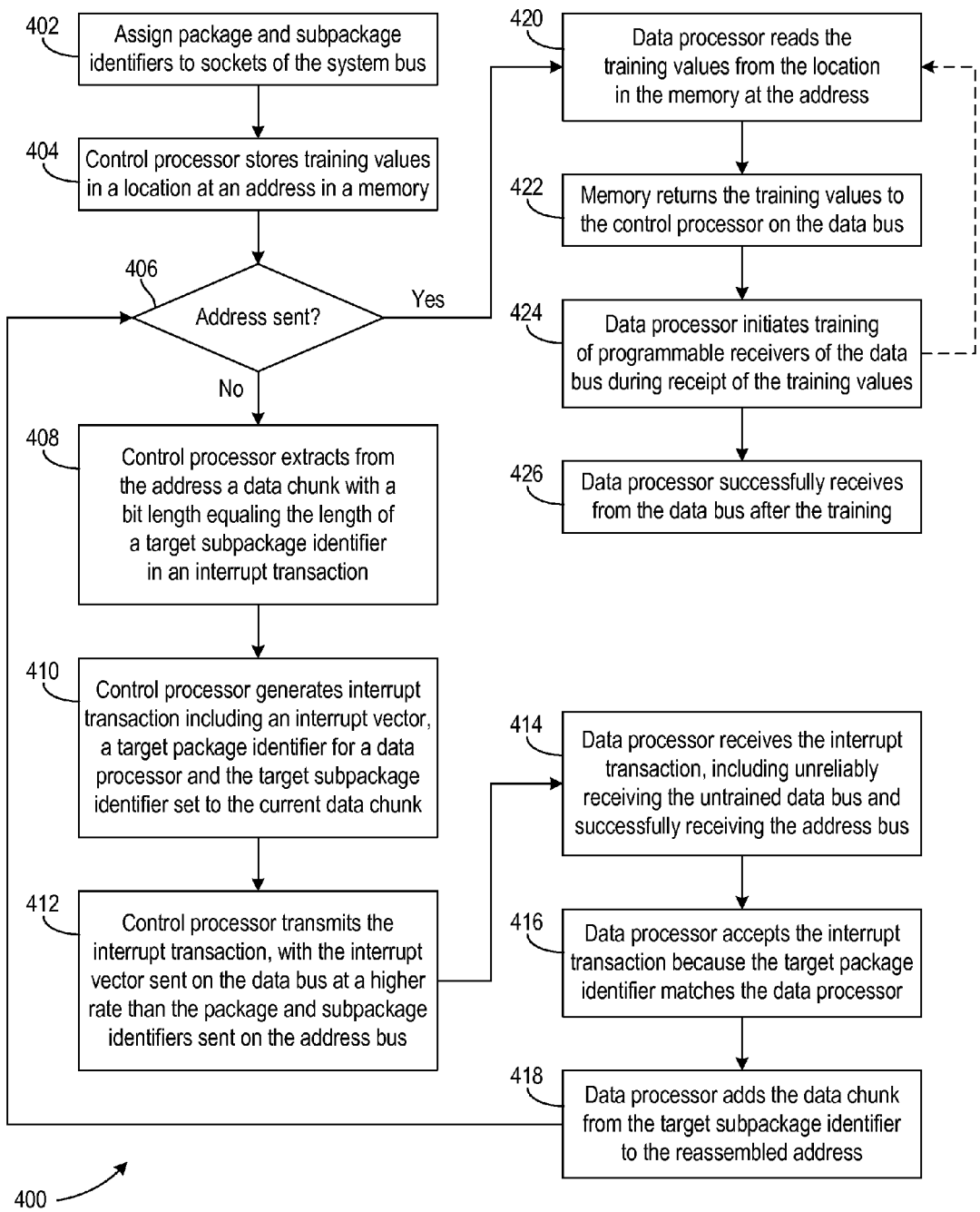
FIG. 4 is a flow diagram of a process for training a programmable integrated circuit to successfully receive data in accordance with various embodiments of the invention.

FIG. 4 is a flow diagram of a process 400 for training a programmable integrated circuit to successfully receive data in accordance with various embodiments of the invention. A control processor sends the address of a buffer of training data to the programmable integrated circuit and the programmable integrated circuit reads from the address to train receivers with the training data from the buffer.

At step 402, a system bus assigns a package identifier and multiple subpackage identifiers to each socket of the system bus. A processor or programmable integrated circuit coupled to each socket of the system bus receives and accepts interrupt transactions having a target identifier including the package identifier assigned to the socket. The subpackage identifier in the target identifier of an interrupt transaction specifies a destination within the processor or programmable integrated circuit receiving and accepting the interrupt transaction.

At step 404, a control processor stores predetermined training data in an allocated location at an address in a memory. In a system that includes multiple processors or a multiprocessor that includes multiple processors, the control process is one of more of these processors.

Decision 406 checks whether the control processor has sent the entire address of the training data to the data processor. Process 400 proceeds to step 408 when the control processor has not yet sent the entire address. At step 408, the control processor extracts the next data chunk from the address. The bit length of the extracted data chunk matches the bit length of the subpackage identifier in the target identifier field of an interrupt transaction. At step 410, the control processor generates an interrupt transaction including an interrupt vector and a target identifier including package and subpackage identifiers, and the package identifier is set to the package identifier of the data processor and the subpackage identifier is set to the current data chunk.

At step 412, the control process transmits the generated interrupt transaction on the system bus. The interrupt vector is transmitted on the data bus of the system bus and the target identifier including the package and subpackage identifiers is transmitted on the address bus of the system bus. The data bus operates at a higher switching rate than the address bus. In one embodiment, the interrupt vector is arbitrary data transmitted on the data bus at the higher switching rate.

At step 414, the data processor receives the interrupt transaction. The data processor successfully receives the target identifier on the address bus, but the data processor unreliably receives the interrupt vector from the data bus. The data processor unreliably receives from the data bus because the data bus is operating at the higher switching rate and programmable receivers in the data processor cannot reliably receive at the higher switching rate until the programmable receives are trained during receipt of known data. At step 416, the data processor accepts the interrupt transaction because the package identifier in the target identifier matches the package identifier assigned to the socket of the data processor at step 402.

At step 418, the data processor reassembles the address from the data chunk in the target subpackage identifier of the interrupt transaction. Process 400 then returns to decision 406 to check whether another data chunk needs to the transmitted from the control processor to the data processor. After the control processor sends every data chunk to the data processor, the data processor has the entire address of the training data in the memory, and process 400 proceeds to step 420.

At step 420, the data processor reads the training data from the location in the memory at the address. At step 422, the memory completes the read by returning the training data to the control processor. At step 424, the data processor initiates training of its programmable receivers coupled to the data bus of the system bus. If the current configuration of the programmable receiver does not correctly receive the training data, the configuration is adjusted and process 400 returns to step 420 in one embodiment. After the data processor successfully receives the training values, process 400 proceeds to step 426. At step 426, the data processor successfully receives more data values from the data bus after the training.

The present invention is thought to be applicable to a variety of systems and methods for communicating data from a source device to a target device. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method of communicating data from a source device to a target device, comprising:
    segmenting a communicated data value into a plurality of data chunks at the source device;
    transmitting a sequence of interrupt transactions from the source device to a system bus, wherein the transmitting of each interrupt transaction in the sequence includes transmitting a target identifier on an address bus of the system bus, the target identifier of each interrupt transaction in the sequence including a respective one of the data chunks;
    receiving the sequence of interrupt transactions from the system bus at the target device; and
    reassembling the communicated data value at the target device from the data chunks in the target identifier of the interrupt transactions in the sequence;
    wherein the transmitting of each interrupt transaction in the sequence from the source device includes the transmitting of the target identifier of the interrupt transaction on the address bus at a first switching rate and transmitting an interrupt vector of the interrupt transaction on a data bus of the system bus at a second switching rate greater than the first switching rate.

2. The method of claim 1, further comprising routing each interrupt transaction in the sequence from the source device to the target device via the system bus in response to the target identifier of the interrupt transaction.

3. The method of claim 1, wherein the receiving of each interrupt transaction in the sequence at the target device includes successfully receiving the target identifier from the address bus at the first switching rate and unreliably receiving the interrupt vector from the data bus at the second switching rate because the second switching rate is greater than the first switching rate.

4. The method of claim 3, wherein the receiving of the sequence of interrupt transactions includes receiving the sequence of interrupt transactions at the target device that is a data processor implemented in a programmable integrated circuit including at a plurality of programmable receivers and an array of programmable logic and interconnect resources.

5. The method of claim 4, wherein the unreliably receiving of the interrupt vector from the data bus includes unreliably receiving the interrupt vector from the data bus at the programmable receivers prior to training the programmable receivers during receipt of a plurality of predetermined data values from the data bus.

6. The method of claim 5, further comprising writing the predetermined data values from the source device to a location in a memory, wherein the segmenting of the communicated data value includes segmenting the communicated data value that is an address of the location in the memory, and the reassembling of the communicated data value includes at the data processor reassembling the address from the data chunks in the interrupt transactions in the sequence.

7. The method of claim 6, further comprising the training of the programmable receivers during the receipt at the data processor of the predetermined data values in response to the data processor reading from the location in the memory at the address, and at the data processor successfully receiving another communicated data value from the source device via the data bus following the training.

8. The method of claim 3, further comprising respectively assigning a first and second package identifier to a first and second socket of the system bus and respectively assigning a first and second plurality of subpackage identifiers to the first and second sockets, wherein:
the transmitting of the sequence of interrupt transactions to the system bus includes transmitting the sequence of interrupt transactions from the source device that is a first processor in the first socket of the system bus, and
the receiving of the sequence of interrupt transactions from the system bus includes receiving the sequence of interrupt transactions at the target device that is a second processor in the second socket of the system bus.

9. The method of claim 8, wherein:
the transmitting of the target identifier of each interrupt transaction in the sequence includes transmitting the target identifier including a target package identifier and a target subpackage identifier,
the target package identifier is set to the second package identifier of the second socket for the second processor, and
the target subpackage identifier is set to the respective data chunk for the interrupt transaction.

10. The method of claim 9, further comprising at the second processor accepting each interrupt transaction in the sequence in response to the target package identifier of the interrupt transaction being the second package identifier of the second socket for the second processor.

11. The method of claim 10, wherein the receiving of the sequence of interrupt transactions at the second processor includes receiving the sequence of interrupt transactions at the second processor implemented in a programmable integrated circuit including a plurality of programmable receivers and an array of programmable logic and interconnect resources.

12. The method of claim 11, wherein the unreliably receiving of the interrupt vector from the data bus includes unreliably receiving the interrupt vector from the data bus at the programmable receivers prior to training the programmable receivers during receipt of a plurality of predetermined data values from the data bus.

13. The method of claim 12, further comprising writing the predetermined data values from the first processor to a location in a memory, wherein:

the segmenting of the communicated data value includes at the first processor segmenting the communicated data value that is an address of the location in the memory, and
the reassembling of the communicated data value includes at the second processor reassembling the address from the data chunks in the interrupt transactions in the sequence.

14. The method of claim 13, further comprising:
the training of the programmable receivers during the receipt at the second processor of the predetermined data values in response to the second processor reading from the location in the memory at the address, and
at the second processor, successfully receiving another communicated data value from the first processor via the data bus following the training.

15. A computing system for communicating data, comprising:
a system bus including an address bus and a data bus, the data bus operating at a higher switching rate than the address bus, the system bus having a first and second socket, the system bus assigning respective package identifiers to the sockets;
a first processor coupled to the address and data busses in the first socket of the system bus;
the first processor segmenting a communicated data value into a plurality of data chunks and transmitting a sequence of interrupt transaction on the system bus;
the first processor including a respective one of the data chunks in each interrupt transaction in the sequence;
each interrupt transaction in the sequence including an interrupt vector and a first and second identifier;
the first processor transmitting the interrupt vector on the data bus and transmitting the first and second identifiers on the address bus;
the first processor setting the first identifier of each interrupt transaction in the sequence to the respective package identifier of the second socket and setting the second identifier of the interrupt transaction to the respective data chunk for the interrupt transaction;
a second processor coupled to the address and data busses in the second socket of the system bus;
the second processor successfully receiving the address bus and unreliably receiving the data bus at the higher switching rate prior to a training;
the second processor receiving and accepting each interrupt transaction in the sequence in response to the first identifier of the interrupt transaction including the respective package identifier of the second socket;
the second processor reassembling the communicated data value from the data chunks in the second identifier of the interrupt transactions in the sequence;
the second processor successfully receiving the data bus after the training that includes the second processor receiving a plurality of predetermined data values on the data bus; and
the second processor receiving the predetermined data values on the data bus in response to the communicated data value reassembled from the sequence of interrupt transactions.

16. The computing system of claim 15, further comprising a memory coupled to the address and data bus of the system bus, wherein:
the first processor stores the predetermined data values in a location in the memory;

the first processor transmits in the sequence of interrupt transactions the communicated data value that is an address of the location;

the second processor receives the address as the communicated data value in the sequence of interrupt transactions; and the second processor initiates the training that includes the second processor receiving the predetermined data values in response to the second processor reading the predetermined data values from the location at the address in the memory.

17. The computing system of claim 15, wherein:

the second processor is implemented in a programmable integrated circuit including a plurality of programmable receivers and an array of programmable logic and interconnect resources, the programmable receivers unreliably receive the data bus prior to the training, and the programmable receivers successfully receive the data bus after the training.

18. A method of communicating data from a first processor to a second processor, comprising:

assigning respective package identifiers to a first and second socket of a system bus, the system bus including an address bus and a data bus, the data bus operating at a higher switching rate than the address bus;

segmenting a communicated data value into a plurality of data chunks at the first processor in the first socket;

transmitting a sequence of interrupt transactions to the system bus from the first processor, wherein:

each interrupt transaction in the sequence includes an interrupt vector and a first and second identifier, the transmitting of each interrupt transaction in the sequence includes transmitting the interrupt vector on the data bus and transmitting the first and second identifiers on the address bus, with the transmitting of the interrupt vector on the data bus being at the higher switching rate than the transmitting of the first and second identifier on the address bus, and the first identifier of each interrupt transaction in the sequence is set to the respective package identifier of the second socket and the second identifier of each interrupt transaction in the sequence set to a respective one of the data chunks;

receiving each interrupt transaction in the sequence from the system bus at the second processor in the second socket, wherein the receiving includes successfully receiving the address bus and unreliably receiving the data bus prior to training during receipt of a plurality of predetermined data values on the data bus, and successfully receiving the data bus after the training;

accepting, at the second processor prior to the training, each interrupt transaction in the sequence in response to the first identifier of the interrupt transaction including the respective package identifier of the second socket; and reassembling, at the second processor, the communicated data value from the data chunks in the second identifier of the interrupt transactions in the sequence.

19. The method of claim 18, further comprising writing the predetermined data values from the first processor to a location in a memory, wherein:

the segmenting and reassembling of the communicated value includes segmenting and reassembling the communicated value that is an address of the location in the memory, and the training includes transferring the predetermined data values from the location in the memory to the second processor in response to the second processor reading the location in the memory at the address reassembled from the interrupt transactions in the sequence.

* * * * *